(12) United States Patent
Leaf et al.

(10) Patent No.: US 11,765,405 B2
(45) Date of Patent: Sep. 19, 2023

(54) CATEGORIZING LIVE STREAM OF CONTENT

(71) Applicant: Comscore, Inc., Reston, VA (US)

(72) Inventors: Nate Leaf, Prairie du Sac, WI (US);
Vivek Arora, San Ramon, CA (US);
Sean Howell, Sterling, VA (US);
Raymond P. Smith, Lovettsville, VA (US)

(73) Assignee: Comscore, Inc., Reston, VA (US)

( * ) Notice: Subject to any disclaimer, the term of this patent is extended or adjusted under 35 U.S.C. 154(b) by 0 days.

(21) Appl. No.: 17/410,964

(22) Filed: Aug. 24, 2021

(65) Prior Publication Data

US 2022/0060762 A1 Feb. 24, 2022

Related U.S. Application Data

(60) Provisional application No. 62/706,534, filed on Aug. 24, 2020.

(51) Int. Cl.
| | |
|---|---|
| *H04N 21/2187* | (2011.01) |
| *H04N 21/234* | (2011.01) |
| *H04N 21/84* | (2011.01) |
| *H04N 21/233* | (2011.01) |
| *H04N 21/858* | (2011.01) |

(52) U.S. Cl.
CPC ....... *H04N 21/2187* (2013.01); *H04N 21/233* (2013.01); *H04N 21/23418* (2013.01); *H04N 21/23424* (2013.01); *H04N 21/84* (2013.01); *H04N 21/8586* (2013.01)

(58) Field of Classification Search
CPC ............. H04N 21/2187; H04N 21/233; H04N 21/23418; H04N 21/23424; H04N 21/84; H04N 21/8586; H04N 21/812
See application file for complete search history.

(56) References Cited

U.S. PATENT DOCUMENTS

| 10,887,672 | B1 * | 1/2021 | Wu ...................... G06V 30/248 |
| 2009/0119369 | A1 * | 5/2009 | Chou ...................... G06F 16/40 709/205 |
| 2013/0031582 | A1 * | 1/2013 | Tinsman ............ H04N 21/4316 725/36 |
| 2020/0365188 | A1 * | 11/2020 | Brinkman, Jr. ..... H04N 21/8549 |
| 2021/0274244 | A1 * | 9/2021 | Wondra ............. H04N 21/2187 |
| 2022/0014804 | A1 * | 1/2022 | Maalej ............... H04N 21/2668 |

* cited by examiner

*Primary Examiner* — Adil Ocak
(74) *Attorney, Agent, or Firm* — Blank Rome LLP (57) ABSTRACT

Determining attributes for a stream of live content (e.g., live-streaming videos) is described. Initially, a stream of live content is received. One or more attributes are then extracted from a first segment and a second segment of the stream. The first segment and the second segment of the stream may have the same predetermined duration and the second segment may at least partially overlap with the first segment. The one or more attributes extracted from the first segment may be transmitted at a first time, such as at a first break in the stream of content. The one or more attributes extracted from the second segment may be transmitted at a second time, such as at a second break in the stream of content. The attributes from the first and second segments may be transmitted to a content provider and/or a creative provider, such as an advertiser.

20 Claims, 5 Drawing Sheets

CATEGORIZING LIVE STREAM OF CONTENT

CROSS REFERENCE TO RELATED APPLICATIONS

This application claims the benefit of U.S. Provisional Patent App. No. 62/706,534, filed Aug. 24, 2020, the disclosure of which is hereby incorporated by reference herein.

TECHNICAL FIELD

The present disclosure relates to systems and methods for determining attributes of video content and, more particularly, systems and methods for determining and transmitting attributes of live-streaming video content in real-time.

BACKGROUND

Content providers may need to categorize content so that appropriate creatives, such as advertisements, may be inserted into the content. Content providers typically process video content, such as on-demand video content, for categorization prior to publishing the content. This pre-publishing processing allows for appropriate advertisements to be inserted into scheduled ad breaks of the video content. However, current categorization approaches do not allow for the categorization of live-streaming video content, which may include unscheduled ad breaks. By the time a content provider determines that an unscheduled ad break in a live-streaming video is about to occur, the content provider may have only a few seconds to categorize the content and choose an appropriate advertisement. There is thus a need for an approach that provides categorization of a live content stream in real-time.

SUMMARY

Systems and methods are disclosed for determining attributes of livestreaming video content. Accordingly, one or more aspects of the present disclosure relate to a method including receiving a stream of live content and extracting one or more attributes from the stream of live content in real time. The method further includes transmitting, at a first time, attributes for a first segment of the stream of live content, where the first segment has a predetermined duration. The method also includes transmitting, at a second time, attributes for a second segment of the stream of live content, where the second segment has the predetermined duration, and where the second segment at least partially overlaps with the first segment.

Yet another aspect of the present disclosure relates to a system configured for determining attributes of live-streaming video content. The system comprises one or more processors and other components or media, e.g., upon which machine-readable instructions may be executed to determine attributes of live-streaming video content using the mentioned method. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure.

DETAILED DESCRIPTION

A content provider or a creative provider, such as an advertiser, may wish to insert supplemental content (e.g., creatives, such as advertisements), into a stream of live content, such as live-streaming video content. When selecting supplemental content to be inserted, the content provider or creative provider may need to determine attributes and categorize the stream of live content. Depending on how the stream of live content is categorized, a particular supplemental content item may or may not be appropriate for insertion. For example, categorization of the stream of live content may allow the content provider or creative provider to select a supplemental content item that is related to the subject matter of the stream. In another example, the content provider or creative provider may not want to include a supplemental content item relating to children in content that is categorized as adult content.

As explained in greater detail below, providing attributes of live content at predetermined intervals enables the selection of appropriate supplemental content items in real-time, thereby allowing the content provider or creative provider to address brand safety concerns even for unexpected breaks in the stream of live content. This improves the capabilities of prior systems which could not categorize live content in a timely manner to enable appropriate supplemental content items to be selected for live content.

Figure 1:
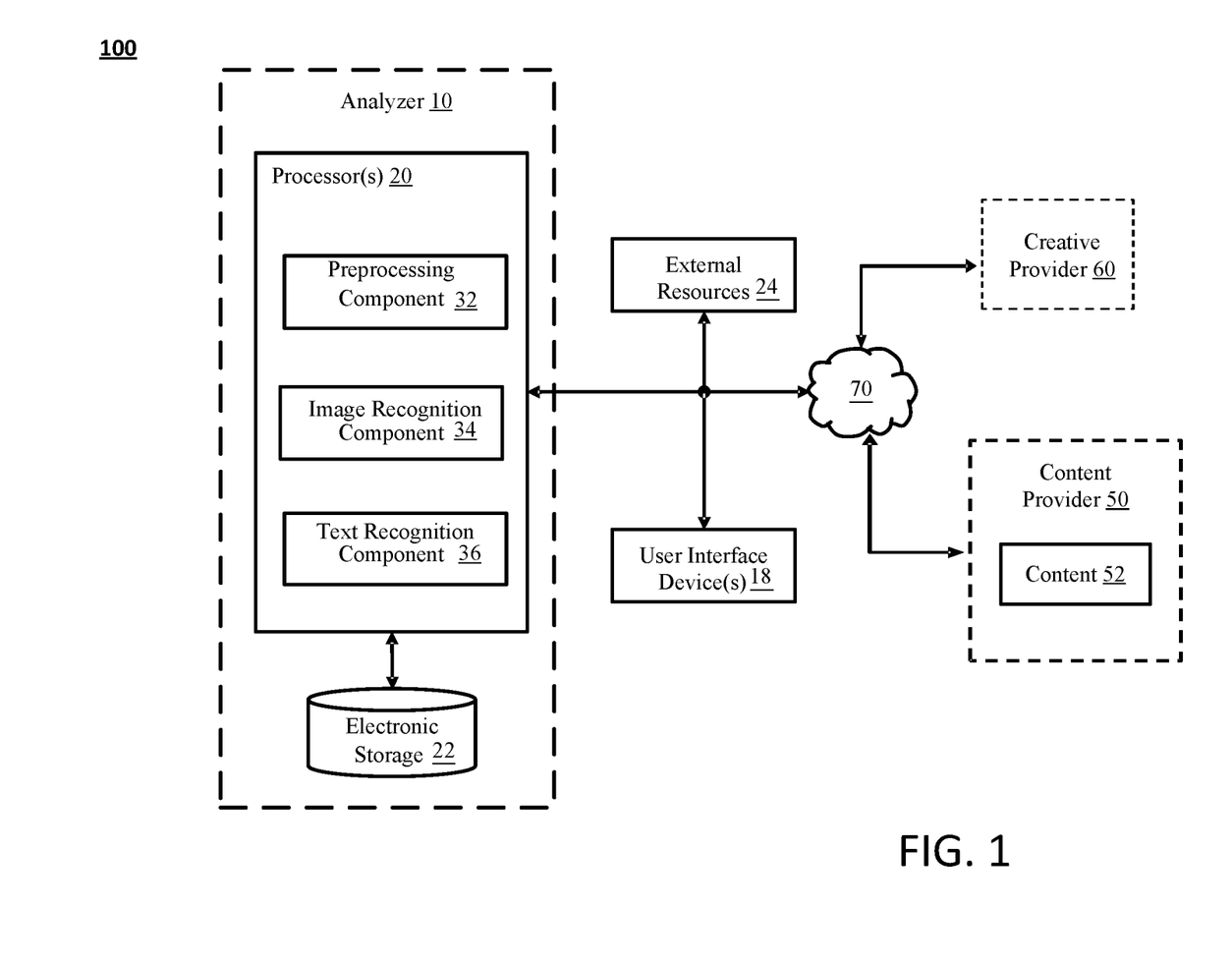
FIG. 1 schematically illustrates a system configured for determining attributes of livestream video content, in accordance with one or more embodiments.

FIG. 1 illustrates a system 100 configured to determine attributes of and/or categorize a stream of live content in accordance with one or more embodiments. The system 100 may comprise one or more analyzers 10, one or more content providers 50, one or more creative providers 60, one or more user interface devices 18, and one or more external resources 24 in communication with one another via a network 70. The network 70 can be the Internet and can be wireless or wired.

Each content provider 50 may, for example, be a website owner or a content publisher, such as a television or radio channel, media company, movie studio, etc. The content provider 50 may distribute content 52 to households and/or user devices. Non-limiting examples of a content provider 50 include a television broadcast network, a cable television network, a satellite television network, an internet service provider (ISP), a computing device advertising network, a media distribution network, a cloud computing network, a local area network (LAN), a wide area network (WAN), or any combination thereof.

The content 52 transmitted by the content provider 50 may include one or more content items. A content item may comprise, as an example, a video program. A video program may refer generally to any video content produced for viewer consumption. A video program may comprise video content produced for broadcast via over-the-air radio, cable, satellite, or the internet. A video program may comprise video content produced for digital video streaming, such as live video streaming, or video-on-demand. A video program may comprise a television show or program. A video program series may comprise two or more associated video programs. For example, a video program series may include an episodic or serial television series. As another example, a video program series may include a documentary series, such as a nature documentary series. As yet another example, a video program series may include a regularly scheduled video program series, such as a nightly news program.

The content provider 50 may be configured to operate across physical device platforms and networks simultaneously. For example, content may be delivered by the content provider 50 to set-top-boxes (STBs) and/or digital video recorders (DVRs) over a cable television system, to mobile computing devices using standard network communication protocols (for instance, Ethernet or Wi-Fi) over an ISP network, to smart devices over standard telecommunication protocols (for instance, third Generation (3G), fourth Generation (4G), long-term evolution (LTE), or the like), and to home gateway devices through a LAN, WAN and/or ISP network.

The content 52 may be distributed by the content provider 50 to an audience. The audience may include households that each comprise one or more user devices capable of receiving content 52 through various user devices, such as the one or more user interface (UI) device(s) 18. The plurality of user interface devices 10 may comprise any one of numerous types of devices configured to effectuate content output (e.g., playback) and/or viewing. The plurality of user interface devices 18 may be configured to receive content and output the content 52 to a separate display device for consumer viewing.

A creative provider 60 may be a company seeking to market or sell products or services, or an advertisement agency or broker that may provide supplemental content (e.g., creatives) to a content provider 50. Supplemental content may generally include any type of data capable of being received and consumed by a recipient. For example, supplemental content may include advertising, entertainment programs, informational programs, messages, video, audio, graphical, and/or animated content. The supplemental content may include, for example, one or more addressable (e.g. targeted) advertisements.

The supplemental content may be inserted into a stream of content 52 transmitted by the content provider 50. For example, the supplemental content may be inserted into a supplemental content insertion opportunity (e.g. avail) in the stream of content 52. Such supplemental content insertion opportunities may be indicated by one or more supplemental content insertion markers inserted into the stream of content 52. The supplemental content insertion markers may be, for example, SCTE 35 markers in accordance with the American National Standards Institute (ANSI)/SCTE 35 standard. Additionally, or alternatively, the supplemental content insertion markers may be identified in XML with time codes associated with avail start and end times, and/or any other means of defining supplemental content insertion opportunity times.

The analyzer 10 may be configured to remotely obtain a stream of live content 52 (e.g., live-streaming video) from one or more content providers 50 and perform subsequent processing, such as determining and/or extracted at least one attribute of the live content 52 and categorizing the live content 52. The analyzer 10 may determining the one or more attributes associated with the stream of live content 52 by performing pattern recognition on the stream of live content 52.

The attributes extracted from the stream of live content 52 may comprise text attributes, audio attributes, and/or video attributes. For example, text may be extracted from audio and/or video in the stream of live content 52. The extracted text may be cleaned and statistically processed to determine word vectors. Using the word vectors, one or more classifications of the stream of live content 52 may be determined. If the stream of live content 52 is a video stream instead of only an audio stream, the stream of live content 52 may comprise both an audio stream and a video stream. The audio stream may comprise audio attributes, and the video stream may comprise video attributes. The video attributes may be extracted using object and text detection techniques, and the audio attributes may be extracted by converting audio in the audio stream into text.

The one or more attributes extracted from the stream of live content 52 may indicate a brand safety rating for the stream of live content. For example, the brand safety rating may be a Motion Picture Association of America (MPAA) rating such as G, PG, PG-13, R, or NC-17. As another example, the brand safety rating may indicate that the live content stream 52 includes controversial, violent, or obscene content. Examples of such content may include "accidents," "alcohol," "click-baiting," "crime & violence," "epidemic high/low," "gambling/gaming," "health issues," "illegal drugs," "manga," negative news," "NSFW," "offensive," "online illegal," "pornography," "terrorism," "tobacco," "UGC," or "weapons."

The one or more attributes extracted from the stream of live content 52 may indicate a topic or category associated with the stream of live content 52. For example, the stream of live content 52 may be associated with one or more of the following topics and categories: "automotive," "books & literature," "business and finance," "crime and violence," "careers," "education," "events & attractions," "family & relationships," "fine art," "food & drink," "healthy living," "hobbies & interests," "home & garden," "medical health," "movies," "music & audio," "news & politics," "personal finance," "pets," "pop culture," "real estate," "science," "sports," "style & fashion," and "technology."

The at least one attribute may be used, by the content provider 50 or the creative provider 60, to select appropriate supplemental content items for insertion into the stream of live content. For example, if the brand safety rating for the stream of live content 52 is R or NC-17, the live content stream may not be appropriate for a particular supplemental content item, such as an advertisement targeted towards children. As another example, if the brand safety rating indicates that the live content stream 52 includes content about "pornography," the live content stream 52 may not be appropriate for a particular supplemental content item, such as an advertisement targeted towards children. As yet another example, if the attributes indicate that the live content stream 52 is associated with the "pets" category, an advertisement targeted towards pet owners may be selected for insertion into the at least one break in the live content stream 52. Conversely, if the live content stream is associated with the "healthy living" category, the live content stream 52 may not be appropriate for a particular supplemental content item, such as an advertisement for fast food.

The one or more user interface (UI) device(s) 18 may be configured to provide an interface between one or more users and the system 100. The UI devices 18 are configured to provide information to and/or receive information from the one or more users. For example, the UI devices 18 may be configured to allow a user to watch a channel of the content provider 50 showing, for example, the live content 52, and to view a webpage for other web or application content of the content provider 50. As further described below, the UI devices 18 also receive a supplemental content item.

Non-limiting examples of user interface devices 18 include a set-top box (STB), such as a cable STB. A STB may receive video content via a cable input (e.g., co-axial cable or fiber optic cable) and format the received video content for output to a display device. A STB may receive video content via digital video streaming. A STB (or other type of video device) may comprise a quadrature amplitude modulation (QAM) tuner. A STB may comprise a digital media player or a gaming device. A user interface device 18 may comprise a digital video recorder (DVR) that receives and stores video content for later viewing. A user interface device 18 may be in communication with a cloud DVR system to receive video content. A user interface device 18 may comprise one or more of any other type of device, such as, and without limitation, a television, a smart television, a personal computer (PC), a laptop computer, a mobile computing device, a smartphone, a tablet computing device, a home gateway, or the like. A user interface device 18 may combine any features or characteristics of the foregoing examples. For instance, a user interface device 18 may include a cable STB with integrated DVR features.

The UI devices 18 include a user interface and/or other components. The user interface may be and/or include a graphical user interface configured to present views and/or fields configured to receive entry and/or selection with respect to particular functionality of system 100, and/or provide and/or receive other information. In some embodiments, the user interface of the UI devices 18 may include a plurality of separate interfaces. Examples of interfaces include a touch screen, a keypad, touch sensitive and/or physical buttons, switches, a keyboard, knobs, levers, a display, speakers, a microphone, and/or other interface devices. The UI devices 18 can also include a removable storage interface such as a smart card, a flash drive, a removable disk, etc., that enables users to customize the implementation of the UI devices 18 or to store content.

The analyzer includes one or more processors 20 and electronic storage 22. The electronic storage 22 comprises an electronic storage device or media that electronically stores information. The electronic storage media of electronic storage 22 may comprise system storage that is provided integrally (i.e., substantially non-removable) with analyzer 10 and/or removably with analyzer 10 via, for example, a port (e.g., a USB port, a firewire port, etc.) or a drive (e.g., a disk drive, etc.).

Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. The electronic storage 22 may store software algorithms, information obtained and/or determined by processor 20, information received via user interface devices 18 and/or other external computing systems, information received from external resources 24, and/or other information that enables system 100 to function as described herein.

The external resources 24 may include sources of information (e.g., databases, websites, etc.), external entities participating with system 100, one or more servers outside of system 100, a network (e.g., the Internet), electronic storage, equipment related to Wi-Fi technology, equipment related to Bluetooth® technology, data entry devices, and/or other resources. In some implementations, some or all of the functionality attributed herein to external resources 24 may be provided by resources included in system 100. External resources 24 may be configured to communicate with analyzer 10, the UI devices 18, electronic storage 22, and/or other components of system 100 via wired and/or wireless connections, via the network 70 (e.g., a local area network and/or the Internet), via cellular technology, via Wi-Fi technology, and/or via other resources.

The processor 20 is configured to provide information processing capabilities in analyzer 10. The processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, the UI devices 18, devices that are part of external resources 24, electronic storage 22, and/or other devices).

As shown in FIG. 1, the processor 20 is configured via machine-readable instructions to execute one or more computer program components. The computer program components may comprise one or more of preprocessing component 32, image recognition component 34, text recognition component 36, and/or other components. Processor 20 may be configured to execute components 32, 34, and 36 by: software; hardware; firmware; some combination of software, hardware, and/or firmware; and/or other mechanisms for configuring processing capabilities on processor 20.

It should be appreciated that although components 32, 34, and 36 are illustrated in FIG. 1 as being co-located within a single processing unit, in embodiments in which processor 20 comprises multiple processing units, one or more of components 32, 34, and 36 may be located remotely from the other components. The description of the functionality provided by the different components 32, 34, and 36 described below is for illustrative purposes, and is not intended to be limiting, as any of components 32, 34, and 36 may provide more or less functionality than is described. For example, one or more of components 32, 34, and 36 may be eliminated, and some or all of its functionality may be provided by other components 32, 34, and 36. As another example, processor 20 may be configured to execute one or more additional components that may perform some or all of the functionality attributed below to one of components 32, 34, and 36.

Data and content may be exchanged between the various components of the system 100 through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the Internet Protocol (IP) defines addressing methods and structures for datagram encapsulation. Other protocols also may be used.

Figure 2:
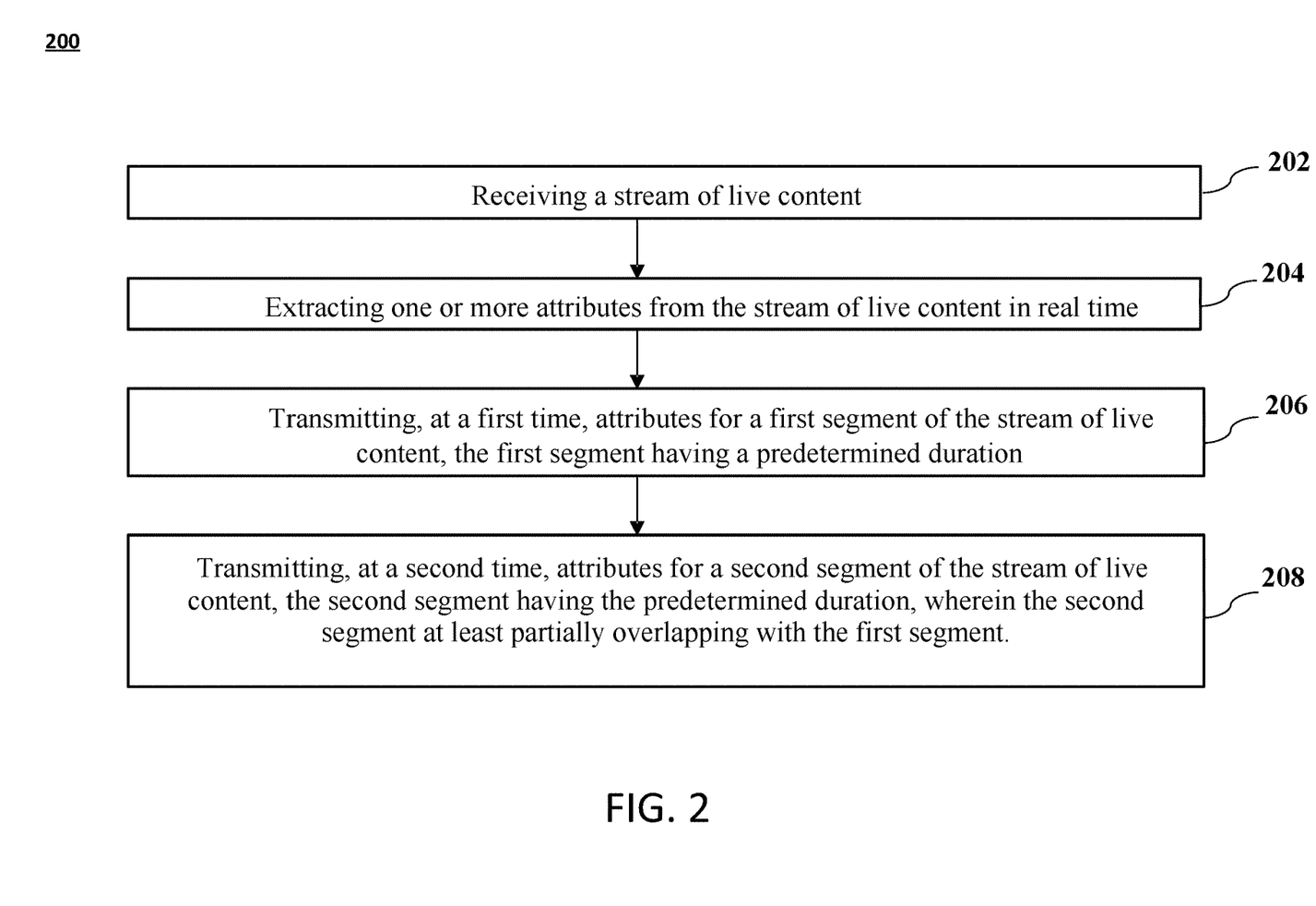
FIG. 2 illustrates a flow chart of an example method in accordance with one or more embodiments.

FIG. 2 illustrates a method 200 for determining attributes of a stream of live content in accordance with one or more embodiments. The method 200 may be implemented by the analyzer 10. The method 200 may be used by the content provider 50 and/or the creative provider 60 to categorize a stream of live content for brand safety purposes or for content categorization. The method 200 ensures that content provider 50 and the creative provider 60 always have relevant categorization for a stream of live content, even when the ad breaks in the stream of live content are unscheduled. The method 200 ensures that every ad break, including the first ad break, may be filled with appropriate supplemental content item. The order in which the operations of method 200 are illustrated in FIG. 2 and described below is not intended to be limiting.

At step 202, a stream of live content 52 may be received from the content provider 50 at the analyzer 10. In some examples, many streams of live content 52 may be received from different content providers 50 in parallel, so the analyzer 10 may be processing one or more streams of live content 52 at a time. For example, the stream of live content 52 may be a live video stream, such as a live television show, a live news broadcast, or a live sporting event. If the stream of live content 52 is a live video stream, the stream of live content 52 may comprise both an audio stream and a video stream.

The stream of live content 52 may be divided into more than one segment, and each segment may be of equal duration. Each segment may have a duration equal to a certain number of seconds and/or minutes. In an embodiment, each segment may have a duration of 45 seconds. In other embodiments, each segment may have a duration that is greater than or less than 45 seconds. Some of the segments may overlap with one another. For example, if one segment comprises the first 45 seconds of the stream of live content 52, the next segment may comprise seconds 40-85 of the stream of live content 52 (a five second overlap between adjacent segments). As another example, if one segment comprises the first 45 seconds of the stream of live content 52, the next segment may comprise seconds 30-75 of the stream of live content 52 (a 15 second overlap between adjacent segments). The overlap between segments may have a duration equal to any number of seconds or minutes.

The stream of live content 52 may also comprise at least one break, such as at least one advertisement break (e.g., supplemental content insertion opportunity, "avail"). As discussed above, supplemental content insertion opportunities may be indicated by one or more supplemental content insertion markers inserted into the stream of live content 52. The supplemental content insertion markers may be, for example, SCTE 35 markers in accordance with the American National Standards Institute (ANSI)/SCTE 35 standard. Additionally, or alternatively, the supplemental content insertion markers may be identified in XML with time codes associated with avail start and end times, and/or any other means of defining supplemental content insertion opportunity times.

During the at least one break, the stream of live content 52 may stop streaming for a predetermined duration, such as 30 seconds. This predetermined duration may be equal to the duration of the at least one break. A supplemental content item, such as an advertisement, may be inserted into the stream of live content 52 during the at least one break. Because the stream of content 52 is live, the at least one break may be unscheduled. By the time a content provider determines that the unscheduled ad break is about to occur, the content provider may have only a few seconds to categorize the content and choose an appropriate supplemental content item. Accordingly, it may be difficult to select an appropriate supplemental content item for insertion into the at least one break.

The stream of live content 52 has a source link. For example, the stream of live content 52 may be associated with an identification number or a source Uniform Resource Locator (URL). If the stream of live content 52 is associated with a URL, the URL may point to the source of the stream. The analyzer 10 may receive the stream of live content 52 by requesting the associated URL from the content provider 50.

Once the analyzer 10 receives the stream of live content 52, the analyzer 10 may analyze the stream of live content 52, by, for example, analyzing the stream of live content 52 to extract attributes from the stream of live content 52.

At step 204, one or more attributes from the stream of live content 52 may be extracted in real time by the analyzer 10. The one or more attributes may be extracted in real time as the stream of live content 52 is received, which may be in segments. For example, if the segments are 45-second segments, the one or more attributes may be extracted every 45-seconds. The one or more attributes may indicate information about the stream of live content 52, such as a topic associated with the live content, a brand safety rating of the live content, or a category of the live content. For example, the one or more attributes extracted from a particular segment of the stream of live content 52 may indicate information about that particular segment, such as a topic associated with the segment, a brand safety rating associated with the segment, or a category of the segment. This information may be used to determine whether the stream of live content 52 is appropriate for inserting a particular supplemental content item.

Extracting the one or more attributes from the stream of live content 52 may comprise performing pattern recognition on the stream of live content 52. The attributes extracted from the stream of live content may comprise text attributes, audio attributes, and/or video attributes. For example, text may be extracted from audio and/or video in the stream of live content 52. The extracted text may be cleaned and statistically processed to determine word vectors. Using the word vectors, one or more classifications of the stream of live content 52 may be determined. If the stream of live content 52 is a video stream instead of only an audio stream, the stream of live content 52 may comprise both an audio stream and a video stream. The audio stream may comprise audio attributes, and the video stream may comprise video attributes. The video attributes may be extracted using object and text detection techniques, and the audio attributes may be extracted by converting audio in the audio stream into text.

The one or more attributes extracted from the stream of live content 52 may indicate a brand safety rating for the stream of live content. For example, the brand safety rating may be a Motion Picture Association of America (MPAA) rating such as G, PG, PG-13, R, or NC-17. If the brand safety rating for the stream of live content 52 is R or NC-17, the live content stream may not be appropriate for a particular supplemental content item, such as an advertisement targeted towards children.

As another example, the brand safety rating may indicate that the live content stream 52 includes controversial, violent, or obscene content. Examples of such content may include "accidents," "alcohol," "click-baiting," "crime & violence," "epidemic high/low," gambling/gaming," "health issues," "illegal drugs," "manga," "negative news," "NSFW," "offensive," "online illegal," "pornography," "terrorism," "tobacco," "UGC," or "weapons." If the brand safety rating indicates that the live content stream 52 includes content about "pornography," the live content stream 52 may not be appropriate for a particular supplemental content item, such as an advertisement targeted towards children.

The one or more attributes extracted from the stream of live content 52 may indicate a topic or category associated with the stream of live content 52. For example, the stream of live content 52 may be associated with one or more of the following topics and categories: "automotive," "books & literature," "business and finance," "crime and violence," "careers," "education," "events & attractions," "family & relationships," "fine art," "food & drink," "healthy living," "hobbies & interests," "home & garden," "medical health," "movies," "music & audio," "news & politics," "personal finance," "pets," "pop culture," "real estate," "science," "sports," "style & fashion," and "technology." If the live content stream 52 is associated with the "pets" category, the live content stream 52 may be selected for a particular supplemental content item, such as an advertisement targeted towards pet owners. For example, an advertisement targeted towards pet owners may be selected for insertion into the at least one break in the live content stream 52. Conversely, if the live content stream is associated with the "healthy living" category, the live content stream 52 may not be appropriate for a particular supplemental content item, such as an advertisement for fast food.

At step 206, attributes for a first segment of the stream of live content 52 may be transmitted at a first time. Transmitting the attributes for the first segment 306 may comprise grouping at least some of the extracted attributes for the first segment 306 of the stream of live content 304 at the end of the first segment.

Figure 3:
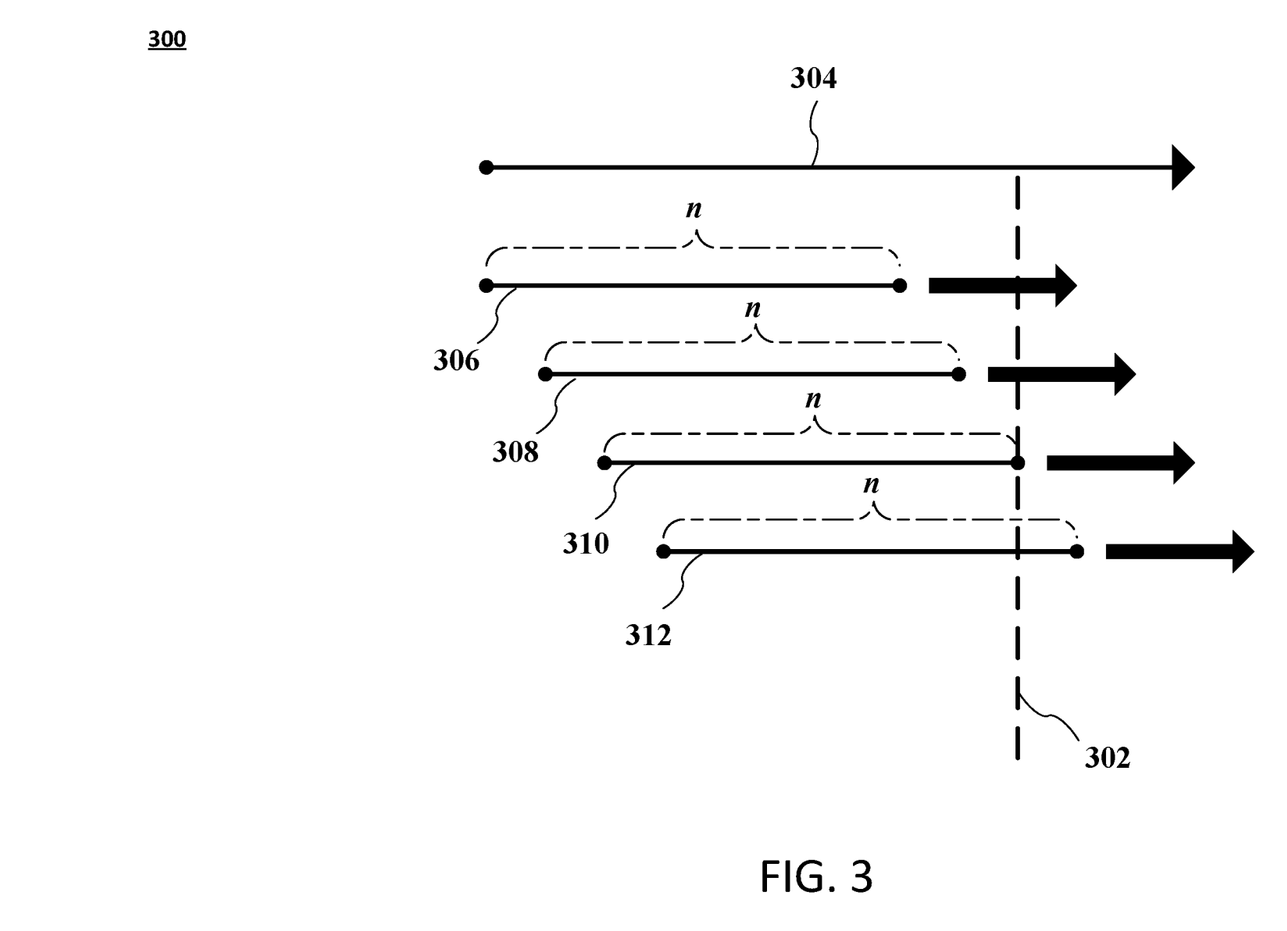
FIG. 3 illustrates a timeline of transmission of attributes in accordance with one or more embodiments.

As shown in the timeline of FIG. 3, a stream of live content may comprise or be divided into more than one segment. For example, the entire stream of live content 304 may be divided into a plurality of segments 306, 308, 310, 312 and an advertisement break 302. Each segment in the plurality of segments 306, 308, 310, 312 may have a predetermined duration, n. The predetermined duration may, for example, be 15 seconds, 30 seconds, 45 seconds, or any other duration. The plurality of segments 306, 308, 310, 312 may overlap with each other. For example, the start time of segment 308 may occur before the end time of segment 306. As a result, a portion of the live stream of content 304 may be included in both segments 306 and 308. Likewise, the start time of segment 310 may occur before the end time of segment 308 and the start time of segment 312 may occur before the end time of segment 310. In an embodiment, consecutive segments in the plurality, such as segments 306 and 308, may have a predetermined overlap duration, such as forty seconds, depending on how often the attributes of the stream of live content 52 are transmitted.

The attributes for the first segment, such as the segment 306 of the stream 304, may be transmitted in response to a request for the attributes of the stream of live content, or at a predetermined interval equal to the duration of the segments. For example, the request may be sent from the content provider 50 or the creative provider 60. The content provider 50 or creative provider 60 may send the request for attributes at the start of a first break, such as the advertisement break 302 of FIG. 3, in the stream of live content. In some examples, the content provider 50 or creative provider 60 may send the request for attributes at a predetermined time before the start of a break in the stream of live content. For example, the content provider 50 or creative provider 60 may send the request for attributes with enough time before the start of a break to allow an appropriate supplemental content item to be selected.

The content provider 50 or creative provider 60 may request the attributes so that an appropriate supplemental content item may be inserted into the first break. In an embodiment, the attributes for the first segment 306 of the stream of live content 304 may be transmitted to a content provider 50, such as the content provider from which the stream of live content is received. In another embodiment, the attributes for the first segment of the stream of live content may be transmitted to a creative provider 60, such as an advertiser or an ad management and ad serving platform.

Referring back to FIG. 2, at step 208, attributes for the second segment of the stream of live content, such as segment 308 of FIG. 3, may be transmitted at a second time that is after the first time. Transmitting the attributes for the second segment 308 of the stream of live content 304 may also comprise grouping at least some of the extracted attributes for the second segment 308 of the stream of live content at the end of the second segment 308 that at least partially overlaps with the first segment 306. The same grouping and transmitting can be performed for third segment 310 and fourth segment 312. The first 306 and the second 308 segment may be consecutive segments of the stream of live content 304 and the second segment 308 may have the same predetermined duration as the first segment 306, such as 15 second, 30 second, 45 seconds, or any other duration. The second segment 308 may at least partially overlap with the first segment 306 so that a portion of the live stream of content 304 may be included in both the first 306 and the second 308 segments. The overlap duration of the first 306 and second 308 segments may be equal to the difference between the second time and the first time, such as five seconds or any other duration.

The attributes for the second segment 308 of the stream may be transmitted in response to a request for the attributes of the stream of live content, or at a predetermined interval equal to the duration of the segments, as described above in connection with step 206. The content provider 50 or creative provider 60 may send the request for attributes at the start of a second break (not shown).

A supplemental content item may be selected based on the transmitted attributes of the stream of live content 52. The supplemental content item may be selected by the content provider 50, creative providers 60, or an ad management and ad serving platform. For example, it the content provider 50 requested the attributes of the stream of live content, the content provider 50 may select a supplemental content item based on the transmitted attributes. Likewise, if the creative provider 60 requested the attributes of the stream of live content, the creative provider 60 may select a supplemental content item based on the transmitted attributes.

Figure 4:
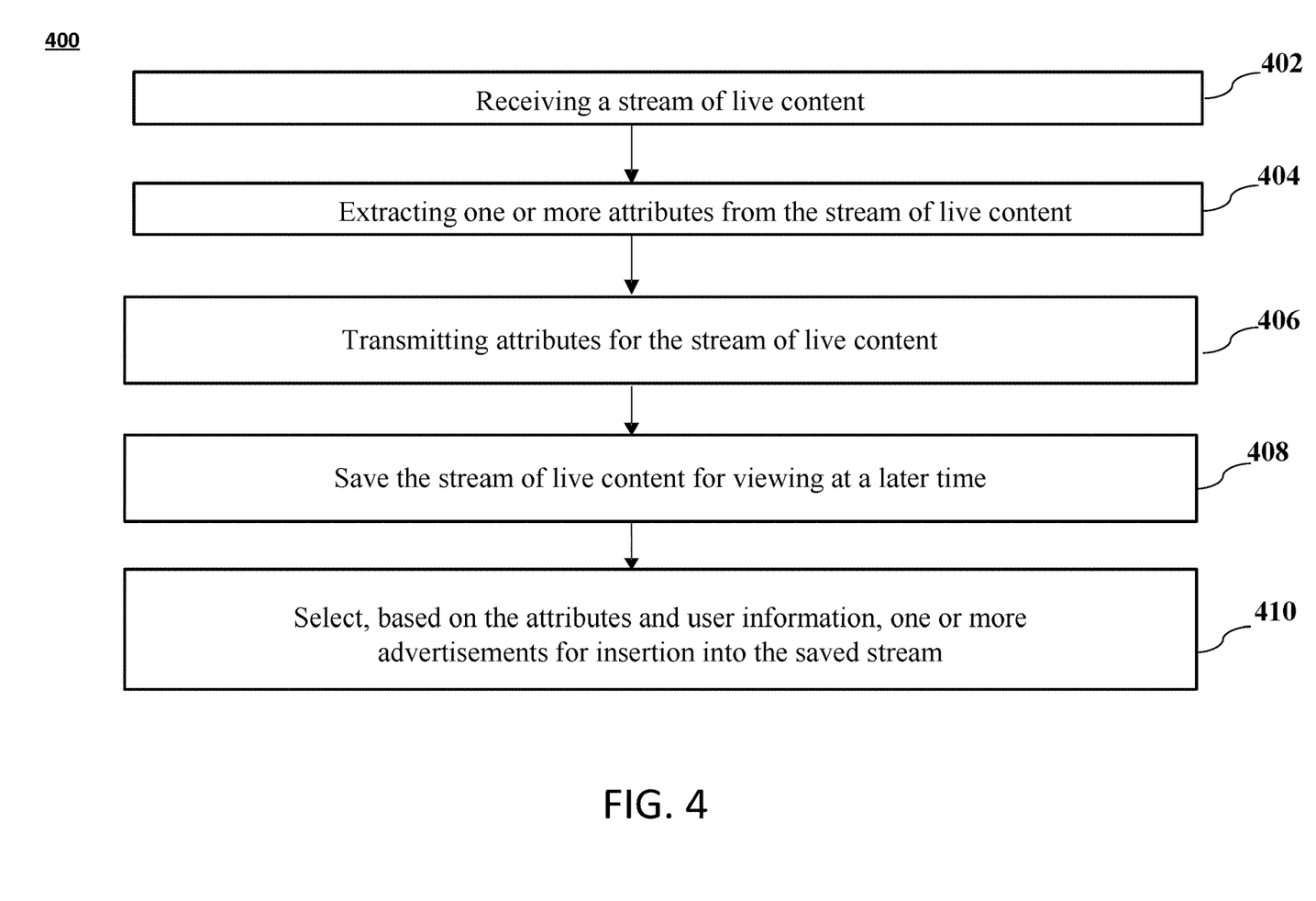
FIG. 4 illustrates a flow chart of an example method in accordance with one or more embodiments.

The supplemental content item may additionally, or alternatively, be selected based on additional information, such as demographic information, associated with the user viewing the stream of live content 52, a compilation of demographics of users viewing the stream of live content 52, census data, and/or the geographic area where the creative is to be served. The additional information can include gender, marital status, ethnic designation, age categories, income categories, household size, etc. The additional information may include dwelling type, behavior/activities, geography, net worth, household composition, discretionary spending, occupation, and/or any other type of consumer category. FIG. 4 illustrates a method 400 for categorizing content, in accordance with one or more embodiments. The method 400 may be used by a content provider 50 to categorize a stream of live content 52 when the stream of live content 52 is being saved for playback at a later time. During later (non-live) playback of the live content 52, content providers 50 and/or creative providers 60 may use a combination of the attributes of the livestream and information about the user to select supplemental content items. The order in which the operations of method 400 are illustrated in FIG. 4 and described below is not intended to be limiting.

At step 402, a stream of live content 52 may be received, as described in connection with step 202. At step 404, one or more attributes from the stream of live content 52 may be extracted in real time or after the live stream is complete and saved. For example, the one or more attributes may be extracted in real time as the stream of live content 52 is received, which may be in segments. For example, if the segments are 45-second segments, the one or more attributes may be extracted every 45-seconds. Alternatively, the attributes may be extracted from the entire live steam is complete.

The one or more attributes may indicate information about the stream of live content 52, such as a topic associated with the live content, a brand safety rating of the live content, or a category of the live content. For example, the one or more attributes extracted from a particular segment of the stream of live content 52 may indicate information about that particular segment, such as a topic associated with the segment, a brand safety rating associated with the segment, or a category of the segment. This information may be used to determine whether the stream of live content 52 is appropriate for inserting a particular supplemental content item.

Extracting the one or more attributes from the stream of live content 52 may comprise performing pattern recognition on the stream of live content 52. The attributes extracted from the stream of live content may comprise text attributes, audio attributes, and/or video attributes. For example, text may be extracted from audio and/or video in the stream of live content 52. The extracted text may be cleaned and statistically processed to determine word vectors. Using the word vectors, one or more classifications of the stream of live content 52 may be determined. If the stream of live content 52 is a video stream instead of only an audio stream, the stream of live content 52 may comprise both an audio stream and a video stream. The audio stream may comprise audio attributes, and the video stream may comprise video attributes. The video attributes may be extracted using object and text detection techniques, and the audio attributes may be extracted by converting audio in the audio stream into text.

The one or more attributes extracted from the stream of live content 52 may indicate a brand safety rating for the stream of live content. For example, the brand safety rating may be a Motion Picture Association of America (MPAA) rating such as G, PG, PG-13, R, or NC-17. If the brand safety rating for the stream of live content 52 is R or NC-17, the live content stream may not be appropriate for a particular supplemental content item, such as an advertisement targeted towards children.

As another example, the brand safety rating may indicate that the live content stream 52 includes controversial, violent, or obscene content. Examples of such content may include "accidents," "alcohol," "click-baiting," "crime & violence," "epidemic high/low," "gambling/gaming," "health issues," "illegal drugs," "manga," "negative news," "NSFW," "offensive," "online illegal," "pornography," terrorism," "tobacco," "UGC," or "weapons." If the brand safety rating indicates that the live content stream 52 includes content about "pornography," the live content stream 52 may not be appropriate for a particular supplemental content item, such as an advertisement targeted towards children.

The one or more attributes extracted from the stream of live content 52 may indicate a topic or category associated with the stream of live content 52. For example, the stream of live content 52 may be associated with one or more of the following topics and categories: "automotive," "books & literature," "business and finance," "crime and violence," "careers," "education," "events & attractions," "family & relationships," "fine art," "food & drink," "healthy living," "hobbies & interests," "home & garden," "medical health," "movies," "music & audio," "news & politics," "personal finance," "pets," "pop culture," "real estate," "science," "sports," "style & fashion," and "technology." If the live content stream 52 is associated with the "pets" category, the live content stream 52 may be selected for a particular supplemental content item, such as an advertisement targeted towards pet owners. For example, an advertisement targeted towards pet owners may be selected for insertion into the at least one break in the live content stream 52. Conversely, if the live content stream is associated with the "healthy living" category, the live content stream 52 may not be appropriate for a particular supplemental content item, such as an advertisement for fast food.

At step 406, attributes for one or more segments of the stream of live content 52 may be transmitted as described above or after the live stream is complete and saved. For example, attributes for one or more segments of the stream of live content 52 may be transmitted in response to a request for the attributes. The request may be received from a content provider 50 and/or a creative provider 60. At step 408, the stream of live content 52 may be saved for viewing at a later time by, for example, the content provider 50 so that a user can view the content at a later time. For example, a user may choose to save a live stream of a football game to view at a later time. The content provider 50 may save a copy of the stream of live content 52, such as in a database. The content provider 50 may output, at a later time as selected by the user, the recording of the stream of live content. The attributes of the stream of live content 52 can be saved at the same time as the stream of live content 52 is saved, or at a later time. The attributes of the stream of live content 52 may be saved in the same database or in a different database as the copy of the stream of live content 52.

At step 410, one or more supplemental content items may be selected for insertion during playback of the saved stream. The one or more creatives may be selected by the content provider 50 or by the creative provider 60, and the selection may be made using the attributes extracted from the content, information about the viewer (such as demographic information), or both. Because the saved content is no longer a live stream, the content provider 50 or creative provider 60 will already know the time(s) at which the breaks occur. In some embodiments, therefore, the content provider 50 or creative provider 60 may select supplemental content items to insert into the breaks before the viewer even begins viewing the saved content.

To display the supplemental content item, a first tag including a first link to a supplemental content item to be displayed during an ad break may be received by the content provider 50 or by a user interface device 18. Next, a second tag corresponding to the first tag may be generated, where the second tag includes a second link to a first set of instructions including instructions to forward a first rating request. The second tag is forwarded to a creative provider 60. Then, it may be determined, based on first metadata of the first rating request, that a first rating satisfies a first set of parameters. The determination that the first rating satisfies the first set of parameters can include determining that the saved content does not include at least one unapproved keyword or the saved content is from an approved domain. Finally, the first tag including the first link to the creative may be forwarded in response to the determination that the first rating satisfies the first set of parameters.

Figure 5:
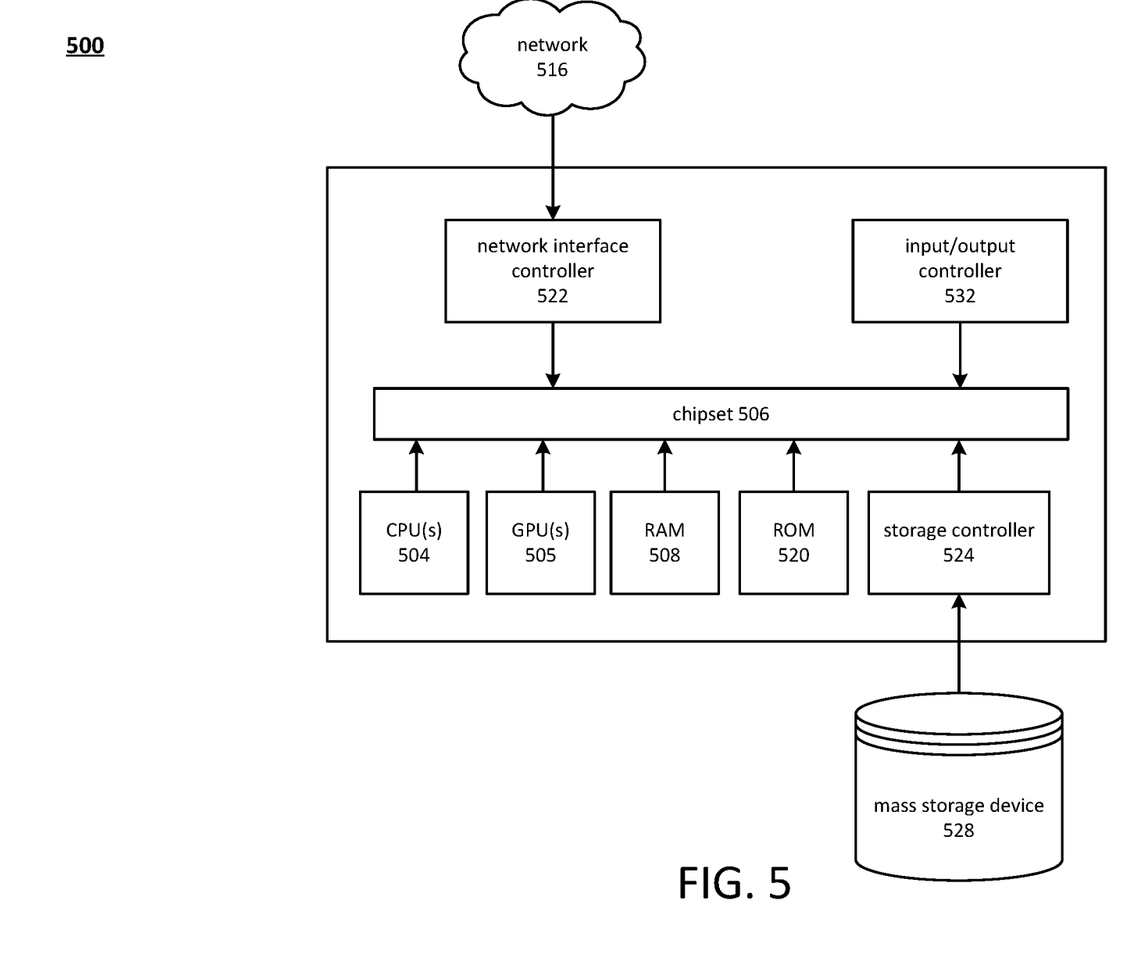
FIG. 5 illustrates an exemplary computing device.

FIG. 5 shows an example computing device 500 that may represent any of the various devices or entities shown in FIG. 1, including, for example, the analyzer 10, the processor(s) 20, the electronic storage 22, the external resources 24, the user interface device(s) 18, the creative provider 60, the content provider 50, and/or the network 70. That is, the computing device 500 shown in FIG. 5 may be any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIG. 1 or any of the methods described in relation to FIGS. 2 and 4.

The computing device 500 may include a baseboard, or "motherboard," which is a printed circuit board to which a multitude of components or devices may be connected by way of a system bus or other electrical communication paths. One or more central processing units (CPUs or "processors") 504 may operate in conjunction with a chipset 1006. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 504 may be augmented with or replaced by other processing units, such as GPU(s) 505. The GPU(s) 505 may comprise processing units specialized for but not necessarily limited to highly parallel computations, such as graphics and other visualization-related processing.

A chipset 506 may provide an interface between the CPU(s) 504 and the remainder of the components and devices on the baseboard. The chipset 506 may provide an interface to a random-access memory (RAM) 508 used as the main memory in the computing device 500. The chipset 506 may provide an interface to a computer-readable storage medium, such as a read-only memory (ROM) 520 or non-volatile RAM (NVRAM) (not shown), for storing basic routines that may help to start up the computing device 500 and to transfer information between the various components and devices. ROM 520 or NVRAM may also store other software components necessary for the operation of the computing device 500 in accordance with the aspects described herein.

The computing device 500 may operate in a networked environment using logical connections to remote computing nodes and computer systems of the system 100. The chipset 506 may include functionality for providing network connectivity through a network interface controller (NIC) 522. A NIC 522 may be capable of connecting the computing device 500 to other computing nodes over the system 100. It should be appreciated that multiple NICs 522 may be present in the computing device 500, connecting the computing device to other types of networks and remote computer systems. The NIC may be configured to implement a wired local area network technology, such as IEEE 802.3 ("Ethernet") or the like. The NIC may also comprise any suitable wireless network interface controller capable of wirelessly connecting and communicating with other devices or computing nodes on the system 100. For example, the NIC 522 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 500 may be connected to a mass storage device 528 that provides non-volatile storage (i.e., memory) for the computer. The mass storage device 528 may store system programs, application programs, other program modules, and data, which have been described in greater detail herein. The mass storage device 528 may be connected to the computing device 500 through a storage controller 524 connected to the chipset 506. The mass storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on a mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 528 is characterized as primary or secondary storage and the like.

For example, the computing device 500 may store information to the mass storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may read information from the mass storage device 528 by detecting the physical states or characteristics of one or more particular locations within the physical storage units.

In addition to the mass storage device 528 described herein, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 528 may store other system or application programs and data utilized by the computing device 500.

The mass storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described herein. The computing device 500 may have access to computer-readable storage media storing computer-executable instructions, which, when executed by the computing device 500, may perform the methods described in relation to FIGS. 2 and 4.

A computing device, such as the computing device 500 depicted in FIG. 5, may also include an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing device may also include a virtual machine host process and one or more virtual machine instances. Computer-executable instructions may be executed by the physical hardware of a computing device indirectly through interpretation and/or execution of instructions stored and executed in the context of a virtual machine.

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:
1. A method comprising:
   receiving a first segment and at least part of a second segment of a stream of live content, wherein the second segment at least partially overlaps with the first segment for a predetermined overlap duration;
   extracting one or more attributes from the first segment in real time;

transmitting, at a first time that is before the end of the second segment, the one or more attributes of the first segment of the stream;
receiving a remainder of the second segment and at least part of a third segment of the stream of live content, wherein the third segment at least partially overlaps with the second segment for the predetermined overlap duration;
extracting one or more attributes from the second segment in real time; and
transmitting, at a second time that is after the first time and before the end of the third segment, the one or more attributes of the second segment.

2. The method of claim 1, wherein:
transmitting the one or more attributes of the first segment comprises grouping the one or more attributes of the first segment at the end of the first segment; and
transmitting the one or more attributes of the second segment comprises grouping the one or more attributes of the second segment of the stream of live content at the end of the second segment.

3. The method of claim 1, further comprising:
receiving a first request for the one or more attributes of the first segment, wherein:
transmitting the one or more attributes of the first segment is in response to the reception of the first request.

4. The method of claim 3, wherein receiving the first request for the one or more attributes of the first segment comprises receiving, at the start of a first break in the stream of live content, the first request for the one or more attributes of the first segment.

5. The method of claim 4, wherein the first break in the stream of live content is a first advertisement break in the stream of live content.

6. The method of claim 3, further comprising:
receiving a second request for the one or more attributes of the second segment, wherein:
transmitting the one or more attributes of the second segment is in response to the reception of the second request.

7. The method of claim 6, wherein receiving the second request for the one or more attributes of the second segment comprises receiving, at the start of a second break in the stream of live content, the second request for the one or more attributes of the second segment.

8. The method of claim 7, wherein the second break in the stream of live content is a second advertisement break in the stream of live content.

9. The method of claim 4, wherein the first break in the stream of live content is before the end of the second segment.

10. The method of claim 1, wherein:
the stream of live content comprises an audio stream and a video stream;
extracting the one or more attributes from the first segment comprises:
extracting one or more audio attributes from the audio stream of the first segment; and
extracting one or more video attributes from the video stream of the first segment; and
extracting the one or more attributes from the second segment comprises:
extracting one or more audio attributes from the audio stream of the second segment; and
extracting one or more video attributes from the video stream of the second segment.

11. The method of claim 10, wherein:
extracting the one or more audio attributes from the audio stream of the first segment comprises converting audio in the audio stream of the first segment to text; and
extracting the one or more audio attributes from the audio stream of the second segment comprises converting audio in the audio stream of the second segment to text.

12. The method of claim 10, wherein:
extracting the one or more video attributes from the video stream of the first segment comprises recognizing objects and text in the video stream of the first segment; and
extracting the one or more video attributes from the video stream of the second segment comprises recognizing objects and text in the video stream of the second segment.

13. The method of claim 1, wherein:
extracting the one or more attributes from the first segment comprises performing pattern recognition on the first segment; and
extracting the one or more attributes from the second segment comprises performing pattern recognition on the second segment.

14. The method of claim 1, wherein the stream of live content is received from a content provider, and the one or more attributes of the first segment and the one or more attributes of the second segment are transmitted to the content provider.

15. The method of claim 1, wherein the stream of live content is received from a content provider, and the one or more attributes of the first segment and the one or more attributes of the second segment are transmitted to a third-party that is different from the content provider.

16. The method of claim 1, wherein the one or more attributes are at least one of a topic, a rating, or a category.

17. The method of claim 1, wherein receiving the first segment, the second segment, and the at least part of the third segment of the stream of live content comprises:
receiving a Uniform Resource Locator pointing to the stream of live content; and
requesting the stream of live content based on the Uniform Resource Locator.

18. The method of claim 1, wherein the first segment, the second segment, and the third segment have the same predetermined duration.

19. The method of claim 1, wherein the first segment, the second segment, and the third segment are consecutive segments of the stream of live content.

20. An apparatus comprising:
one or more processors; and
memory storing instructions that, when executed by the one or more processors, cause the apparatus to:
receive a first segment and at least part of a second segment of a stream of live content, wherein the second segment at least partially overlaps with the first segment for a predetermined overlap duration;
extract one or more attributes from the first segment in real time;
transmit, at a first time that is before the end of the second segment, the one or more attributes of the first segment;
receive a remainder of the second segment and at least part of a third segment of the stream of live content, wherein the third segment at least partially overlaps with the second segment for the predetermined overlap duration;

extract one or more attributes from the second segment in real time; and transmit, at a second time that is after the first time and before the end of the third segment, the one or more attributes of the second segment.

\* \* \* \* \*